United States Patent
Maares et al.

(10) Patent No.: US 9,882,457 B2
(45) Date of Patent: Jan. 30, 2018

(54) METHOD FOR PRODUCING A ROUND STATOR AND ROLLING DEVICE

(71) Applicant: CONTINENTAL AUTOMOTIVE GMBH, Hannover (DE)

(72) Inventors: Benjamin Maares, Ludwigsau (DE); Uwe Schein, Kaufungen (DE)

(73) Assignee: Continental Automotive GmbH, Hannover (DE)

( * ) Notice: Subject to any disclaimer, the term of this patent is extended or adjusted under 35 U.S.C. 154(b) by 597 days.

(21) Appl. No.: 14/355,739

(22) PCT Filed: Oct. 30, 2012

(86) PCT No.: PCT/EP2012/071457
§ 371 (c)(1),
(2) Date: May 1, 2014

(87) PCT Pub. No.: WO2013/064485
PCT Pub. Date: May 10, 2013

(65) Prior Publication Data
US 2014/0290044 A1 Oct. 2, 2014

(30) Foreign Application Priority Data

Nov. 3, 2011 (DE) .................. 10 2011 085 654

(51) Int. Cl.
*H02K 15/02* (2006.01)

(52) U.S. Cl.
CPC ......... *H02K 15/022* (2013.01); *H02K 15/026* (2013.01); *Y10T 29/49009* (2015.01); *Y10T 29/53143* (2015.01)

(58) Field of Classification Search
CPC H02K 15/02; H02K 15/024; Y10T 29/49009; Y10T 29/53143
See application file for complete search history.

(56) References Cited

U.S. PATENT DOCUMENTS

| 3,827,141 A | * | 8/1974 | Hallerback | H02K 1/16 29/596 |
| 3,983,433 A | * | 9/1976 | Sims | H02K 1/12 310/216.003 |
| 4,102,040 A | | 7/1978 | Rich | |
| 4,712,035 A | * | 12/1987 | Forbes | D06F 37/304 29/596 |
| 4,745,675 A | * | 5/1988 | Marks | H02K 1/16 140/71 R |

(Continued)

FOREIGN PATENT DOCUMENTS

| CN | 160185 | 3/2005 |
| DE | 2629532 | 1/1977 |

(Continued)

*Primary Examiner* — Carl Arbes
(74) *Attorney, Agent, or Firm* — Cozen O'Connor

(57) ABSTRACT

A method for producing a round stator includes: inserting wound pole teeth into an insertion section of a rolling device to form a pole tooth row, pushing the pole tooth row into a ring section of the rolling device, which ring section reproduces a round end shape of the stator to form a round stator structure, removing the round stator structure from the rolling device while holding the stator structure together, and processing the stator structure further to form a finished stator unit.

8 Claims, 2 Drawing Sheets

(56) References Cited

U.S. PATENT DOCUMENTS

| | | | | |
|---|---|---|---|---|
| 5,640,752 | A | * | 6/1997 | Steiner ................ H01F 41/0233 29/564.1 |
| 5,986,377 | A | | 11/1999 | Yamada et al. |
| 6,376,961 | B2 | * | 4/2002 | Murakami ......... H02K 15/0478 310/179 |
| 7,337,525 | B2 | * | 3/2008 | Ueda .................. H02K 15/0478 29/596 |
| 8,136,221 | B2 | * | 3/2012 | Takada ............... H02K 15/0478 29/596 |
| 2005/0082919 | A1 | | 4/2005 | Neal et al. |
| 2009/0260219 | A1 | * | 10/2009 | Takada ............... H02K 15/0478 29/596 |
| 2011/0041319 | A1 | * | 2/2011 | Gorohata ........... H02K 15/0037 29/596 |

FOREIGN PATENT DOCUMENTS

| | | |
|---|---|---|
| DE | 10255026 | 7/2004 |
| DE | 10 2007 032 872 | 1/2009 |
| JP | H 11-98774 | 4/1999 |
| JP | 2006-136178 | 5/2006 |
| JP | 2008-283736 | 11/2008 |
| JP | 2008-2833736 | 11/2008 |
| WO | WO 01/54254 | 7/2001 |

\* cited by examiner

METHOD FOR PRODUCING A ROUND STATOR AND ROLLING DEVICE

CROSS-REFERENCE TO RELATED APPLICATIONS

This is a U.S. national stage of application No. PCT/EP2012/071457, filed on 30 Oct. 2012, which claims priority to the German Application No. 10 2011 085 654.4, filed 3 Nov. 2011, the content of both incorporated herein by reference.

BACKGROUND OF THE INVENTION

1. Field of the Invention

The present invention relates to a method for producing a round stator.

2. Related Art

In order to produce a stator of this kind, it is known to wind the corresponding pole teeth in order to obtain a large number of pole teeth with individual tooth winding. It is also known to interconnect wound pole teeth using interconnection wires, so that a cohesive toothed rack-like pole tooth row is produced, wherein the cohesion is produced between the individual pole teeth by the corresponding interconnection wires. The individual wound pole teeth or the cohesive toothed rack-like pole tooth row are/is then manually rounded in order to produce a round stator structure. This procedure is correspondingly complex and/or a complicated mechanism is required for this purpose.

SUMMARY OF THE INVENTION

An object of the present invention is to provide a method for producing a round stator, with which method the stator can be produced with particularly little effort and time.

According to an aspect of the invention, this object is achieved by a method for producing a round stator, which method comprises the following steps:
  inserting wound pole teeth into the insertion section of a rolling device in order to form a pole tooth row;
  pushing the pole tooth row into the ring section of the rolling device, which ring section reproduces the round end shape of the stator; and
  removing the round stator structure from the rolling device with said stator structure being held together, and processing said stator structure further in order to form a finished stator unit.

According to an aspect of the invention, a rolling device is used in the method. The wound pole teeth are inserted into the insertion section of this rolling device, and a pole tooth row is formed in this way. The pole tooth row is pushed into a ring section of the rolling device, which ring section reproduces the round end shape of the stator. A round stator structure with lined-up wound pole teeth is produced in this way and is removed from the rolling device with the structure being held together. The structure is still held together and processed further in this state, until a finished stator unit, in which the individual wound pole teeth together form a fixed cohesive unit, has been produced.

Pole teeth which have already been wound can be used for the method according to an aspect of the invention, or the pole teeth can be pre-wound in order to obtain a large number of pole teeth with individual tooth winding.

The wound pole teeth can be inserted individually into the insertion section of the rolling device and there combined to form a pole tooth row. In another embodiment of the method according to an aspect of the invention, the pole teeth are wound and interconnected in order to obtain a cohesive toothed rack-like pole tooth row which is inserted into the insertion section of the rolling device. Therefore, in this embodiment, the pole teeth are connected to one another by the interconnection wires before being inserted into the rolling device, and a cohesive yet still flexible pole tooth row which is in the form of a toothed rack is obtained. The pole tooth row is then pushed from the insertion section of the rolling device into the ring section of the rolling device in order to produce a round stator structure in this way.

In another aspect, the length of the ring section of the rolling device corresponds approximately to the length of the pole tooth row which is formed in the insertion section or of the toothed rack-like pole tooth row which is produced upstream of the insertion section, so that a closed or virtually closed ring is formed in the ring section of the rolling device.

In another aspect, the pole teeth or the pole tooth row are/is preferably inserted into a rectilinear insertion section of the rolling device. In general, the ring section of the rolling device, which ring section reproduces the round end shape of the stator, can directly adjoin the insertion section, or the pole teeth or the pole tooth row can be pushed from the insertion section, via a spiral transition section, into the ring section of the rolling device. The last-mentioned embodiment has the advantage that, in this case, a gradual transition is made from the insertion section to the ring section with the radius of curvature becoming ever smaller.

In the method according to an aspect of the invention, the round stator structure is removed from the rolling device with the stator structure being held together. In this case, the round stator structure is preferably removed from the rolling device with the individual pole teeth being pressed together. The stator structure can then be processed further in this state. A suitable gripping apparatus, for example a gripper with a suitable number of jaws, in particular a gripper having three jaws or a gripper having two jaws in the form of half-shells, with the jaws preferably forming a closed ring in the closed state, is used for holding the stator structure together or pressing the pole teeth together.

In the corresponding held-together or pressed-together state, the stator structure can be processed further and finally fixed, in particular encapsulated, in order to form a finished round stator unit.

An aspect of the present invention further relates to a rolling device for use in a method of the above-described type. The rolling device is characterized in that it has a slot, the cross section of the slot being matched to the cross-sectional shape of a wound pole tooth and the slot having an insertion section and a ring section.

The slot is preferably configured to receive the wound pole teeth in a vertical manner and has a smaller depth than the height of the pole teeth.

The slot, of which the cross-sectional shape is matched to the cross-sectional shape of a wound pole tooth, guides the pole teeth which are inserted into the insertion section of the slot or the toothed rack-like pole tooth row into the ring section of the slot and therefore rounds or shapes them to form a round stator. The slot therefore serves as a guide channel which is open at the top, so that the produced round stator structure can be removed with the aid of a suitable gripper, as explained above. Since the slot has, in particular, a lower depth than the height of the pole teeth, the gripping device which is provided can grasp the lined-up pole teeth, which are arranged in the ring section of the slot, and lift them out of the slot. In this case, the pole teeth are held together or pressed together in order to form the round stator structure by the gripping device, subjected to further processing, and finally fixed, in particular encapsulated using a suitable plastic, in order to form a finished stator unit.

In this case, the rolling device can be in the approximate form of a plate, wherein the corresponding slot is formed in the surface of the plate. The slot preferably has a rectilinear insertion section which starts from the edge of the plate and issues via a spiral transition section into the ring section which reproduces the shape of the round stator.

BRIEF DESCRIPTION OF THE DRAWINGS

The invention will be explained in detail below with reference to an exemplary embodiment in conjunction with the drawings, in which.

DETAILED DESCRIPTION OF THE PRESENTLY PREFERRED EMBODIMENTS

Figure 1:
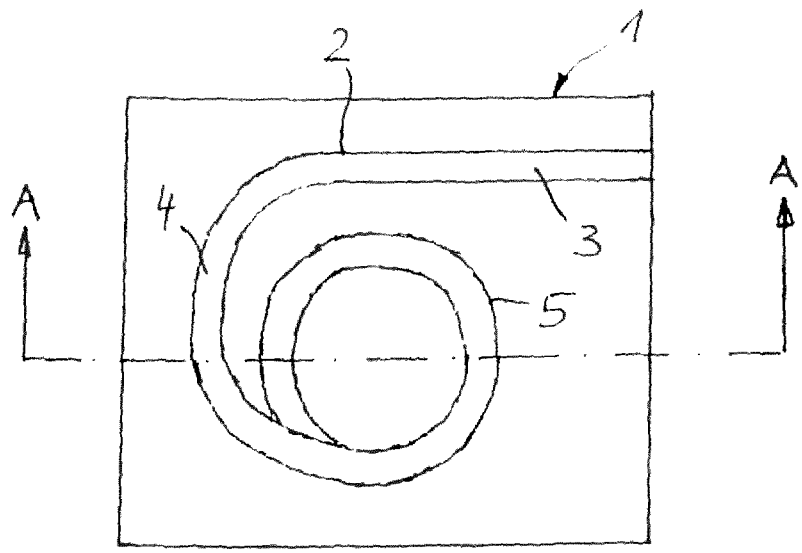
FIG. 1 shows a schematic plan view of a rolling device.
Figure 2:
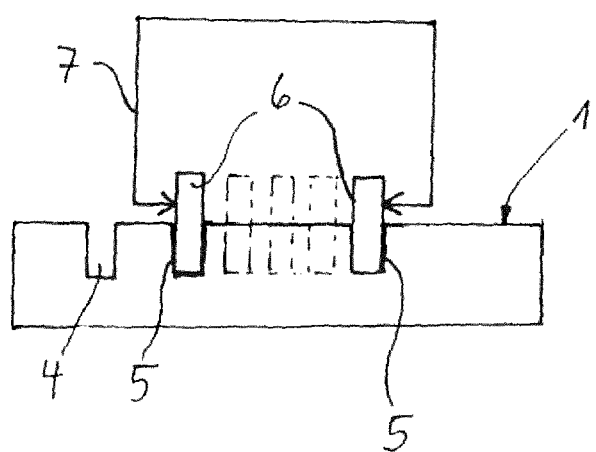
FIG. 2 shows a section along line A-A in FIG. 1.

FIGS. 1 and 2 schematically show a rolling device 1, which serves to produce a round stator. The rolling device 1 is of plate-like design and has a rolling slot or rounding slot 2 on its upper face, the rolling slot or rounding slot having a rectilinear insertion section 3, a spiral transition section 4, which adjoins the insertion section, and a ring section 5, which adjoins the transition section 4. The ring section 5 is in the form of a ring.

The cross-sectional shape of the rolling slot 2 corresponds approximately to the cross-sectional shape of a wound pole tooth 6, which is schematically indicated in FIG. 2. A stator is made up of a large number of wound pole teeth 6 of this kind which, for the purpose of forming a round stator, are inserted into the rectilinear insertion section 3 of the rolling slot 2 in order to form a pole tooth row 10. This pole tooth row 10 is then pushed, via the spiral transition section 4, into the ring section 5, specifically into an end position in which the lined-up wound pole teeth 6 form a ring.

When the pole teeth 6 have assumed this ring position, they are removed from the rolling slot 2 using a suitable gripping device 7, which is schematically illustrated in FIG. 2, and held in the pressed-together state, so that they maintain the ring shape. Corresponding further processing measures can then be carried out, until the ring-like structure is finally encapsulated in a suitable plastic in order to form an integral stator unit.

Figure 3:
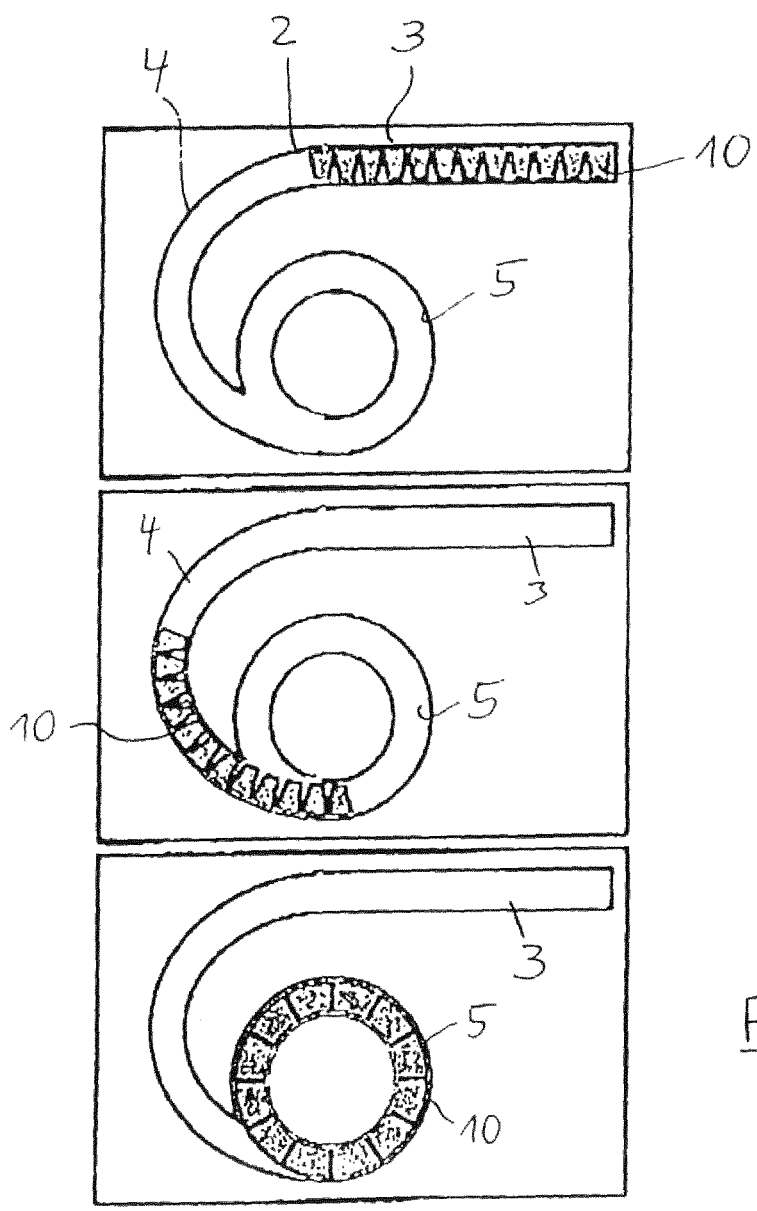
FIG. 3 shows a plan view of the rolling device from FIG. 1 in three different stages of a pole tooth row.

In the embodiment of FIGS. 1 and 2, the wound pole teeth 6 are individually inserted into the insertion section 3 of the rolling slot 2 one after the other. FIG. 3 shows an embodiment of a rolling device 1 in which the pole teeth 6 are individually wound and interconnected before being inserted into the rolling slot 2, so that a cohesive toothed rack-like pole tooth row 10 is produced. This pole tooth row 10 is then inserted into the insertion section 3 of the rolling slot 2, pushed through the spiral transition section 4, until the ring section 5 is reached. As shown in the bottom illustration in FIG. 3, the toothed rack-like pole tooth row 10 then forms a ring-like structure which is lifted out of the rolling slot 2 in a corresponding manner, as shown in FIG. 2. In this case too, a suitable gripping tool presses the toothed rack-like pole tooth row 10 together, so that the ring shape is maintained after it is lifted out. Finally, further processing and fixing, in particular encapsulation, are also performed here in order to form a stator unit.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for producing a round stator, comprising:
inserting a plurality of lined-up and wound individual pole teeth (6) into an insertion section (3) of a slot (2) of a rolling device (1), the cross-sectional shape of the slot (2) being matched to the cross-sectional shape of a wound pole tooth, to form, from the plurality of individual pole teeth (6), a pole tooth row (10);
pushing the pole tooth row (10) into a ring section (5) of the slot (2) of the rolling device (1), which pushing of the pole tooth row (10) into the ring section (5) of the slot (2) into the ring section acts on the pole tooth row (10) so that the pole tooth row (10) reproduces a round end shape of the stator to form a round stator structure comprising the pole teeth (6);
removing the round stator structure from the slot (2) of the rolling device (1) while holding said round stator structure together; and
processing said stator structure further to form a finished stator unit.

2. The method as claimed in claim 1, further comprising, before the inserting step, winding and interconnecting the individual pole teeth (6) so as to obtain a cohesive toothed rack-like pole tooth row (10), which is inserted into the insertion section (3) of the slot (2) of the rolling device (1).

3. The method as claimed in claim 1, wherein the insertion section (3) is rectilinear.

4. The method as claimed in claim 1, wherein the pole tooth row (10) is pushed from the insertion section (3) of the slot (2) of the rolling device (1), via a spiral transition section (4) of the slot (2) of the rolling device (1), into the ring section (5) of the slot (2) of the rolling device (1).

5. The method as claimed in claim 1, wherein the formed round stator structure is removed from the slot (2) of the rolling device (1) with the individual pole teeth (6) being pressed together, and said stator structure is processed further in this state.

6. The method as claimed in claim 1, wherein the round stator structure is fixed so as to form the finished stator unit.

7. A rolling device (1) for forming a round stator, the rolling device (1) for use in a method that includes: inserting a plurality of lined-up and wound individual pole teeth (6) into an insertion section (3) of a slot (2) of the rolling device (1), the cross-sectional shape of the slot (2) being matched to the cross-sectional shape of a wound pole tooth, to form, from the plurality of individual pole teeth (6), a pole tooth row (10); pushing the pole tooth row (10) into a ring section (5) of the slot (2) of the rolling device (1), which pushing of the pole tooth row (10) into the ring section (5) of the slot (2) into the ring section acts on the pole tooth row (10) so that the pole tooth row (10) reproduces a round end shape of the stator to form the round stator structure comprising the pole teeth (6); removing the round stator structure from the slot (2) of the rolling device (1) while holding said round stator structure together; and processing said stator structure further to form a finished stator unit, the rolling device (1) comprising:

the slot (2), the cross section of said slot being matched to the cross-sectional shape of the wound pole tooth (6), and said slot having the insertion section (3) and the ring section (5).

8. The rolling device (1) as claimed in claim 7, wherein the slot (2) is configured to receive the wound pole teeth (6) in a vertical manner and has a depth smaller than the height of the pole teeth (6).

\* \* \* \* \*